United States Patent Office.

WILLIAM GREEN, OF CLEVELAND, OHIO.

*Letters Patent No. 53,140, dated March 13, 1866; reissue No. 3,288, dated February 9, 1869.*

IMPROVED ROOFING-CEMENT, PAINT, &c.

The Schedule referred to in these Letters Patent and making part of the same.

I, WILLIAM GREEN, of Cleveland, in the county of Cuyahoga, and State of Ohio, have invented a new and useful Improvement in Paint, applicable also as a roofing cement and other purposes; and I do hereby declare that the following is a full and complete description of the ingredients used therein, and of the manner of compounding and using the same.

I first take iron-ore of the kind found in the vicinity of Lake Superior, which is a silicate of the oxide of iron, and reduce or crush it to a finely-divided state by any convenient means.

I next mix this reduced ore, which, if desired, may be sifted, with flax-seed, or other oil, and if desirable, add, in suitable proportions, any suitable ingredient or compound known among painters as a drier, and which may be composed of gum-shellac, linseed-oil, and litharge, or oxide of lead.

The mass may then be thinned, if desired, by, for instance, mixing with it spirits of turpentine or naphtha, to any required consistency, which will vary according to the purpose to which the mass is intended to be applied.

If designed to be used as paint, to be laid on with the brush, said mass will necessarily require to be thinner than when used as a cement, or mastic, to be spread with the trowel, which may be done to any desired thickness.

As a paint, after having been laid, it soon becomes hard and dry.

Applied as a roofing-cement, it may be laid on boards, shingles, canvass, or other suitable material, the surface upon which it is laid preferably being smooth, even, and firm, said cement soon becoming hard and firm.

Such cement may also be used as a finish to the fronts of brick buildings, in which case it is desirable that the bricks should first be prepared with a coating of oil, to prevent the absorption of the oil in the cement.

What I claim as my invention, and desire to secure by Letters Patent, is—

A paint or cement, composed of the ingredients herein set forth, prepared and compounded in the manner specified.

WILLIAM GREEN.

Witnesses:

JAMES J. CAMPBELL,
FRANK P. SHELDON.